United States Patent [19]

Poulin

[11] Patent Number: 5,045,136
[45] Date of Patent: * Sep. 3, 1991

[54] METHOD OF MANUFACTURING A HEAT SHRINKABLE ARTICLE

[75] Inventor: Benoit L. Poulin, Hudson, N.H.

[73] Assignee: Essex Group, Inc., Fort Wayne, Ind.

[ * ] Notice: The portion of the term of this patent subsequent to Jun. 6, 2006 has been disclaimed.

[21] Appl. No.: 466,681

[22] Filed: Jan. 17, 1990

Related U.S. Application Data

[60] Continuation of Ser. No. 259,066, Oct. 18, 1988, abandoned, which is a division of Ser. No. 115,306, Nov. 2, 1987, abandoned.

[51] Int. Cl.$^5$ .............................................. B32B 31/20
[52] U.S. Cl. ...................................... 156/85; 156/86; 264/512; 264/230; 264/342 R
[58] Field of Search ........... 264/230, 342 R, DIG. 71, 264/236, 347, 512, 22; 156/86, 85

[56] References Cited

U.S. PATENT DOCUMENTS

| | | | |
|---|---|---|---|
| 3,201,503 | 8/1965 | Benning et al. | 264/230 |
| 3,243,211 | 3/1966 | Wetmore | 264/230 |
| 3,297,819 | 1/1967 | Wetmore | 264/230 |
| 3,303,243 | 2/1967 | Hughes et al. | 264/22 |
| 3,382,121 | 5/1968 | Sherlock | 264/230 |
| 3,396,460 | 8/1968 | Wetmore | 264/230 |
| 3,448,182 | 6/1969 | Derbyshire et al. | 264/230 |
| 4,775,501 | 10/1988 | Rosenweig et al. | 264/230 |

FOREIGN PATENT DOCUMENTS

| | | | |
|---|---|---|---|
| 61-162322 | 7/1986 | Japan | 264/342 R |
| 62-62732 | 3/1987 | Japan | 264/230 |
| 62-113533 | 5/1987 | Japan | 264/512 |
| 2166978A | 11/1984 | United Kingdom | 264/230 |

*Primary Examiner*—Jeffery Thurlow
*Attorney, Agent, or Firm*—Allegretti & Witcoff, Ltd.

[57] ABSTRACT

A heat deformable tube having a melt liner of noncrosslinked, cross-linkable thermoplastic material, such that upon heating to a temperature high enough to cause the tube to return to its original shape; the melt liner melts and encapsulates the substrate.

4 Claims, 1 Drawing Sheet

METHOD OF MANUFACTURING A HEAT SHRINKABLE ARTICLE

RELATED APPLICATIONS

This is a continuation of application Ser. No. 259,066 filed Oct. 18, 1988, abandoned, which is a division of Ser. No. 115,306 filed Nov. 2, 1987, abandoned

TECHNICAL FIELD

The present invention relates to the field of heat deformable articles and their method of manufacture and application. More particularly the field of heat deformable articles having meltable layers which act as sealing agents.

BACKGROUND OF THE INVENTION

In the past, heat deformable products have been used to hold items together, i.e. a bundle of wire or to protect the surface of some article to allow for a better grip, i.e. a handlebar. All of these objectives were achieved by placing a heat shrinkable tube about the article and applying heat to cause the tube to shrink and conform tightly about the article.

However, there have been certain objectives to which such shrinkable tubing would lend itself except for the fact that, although the tube shrinks snuggly about the article, it does not result in a water-tight or dust-tight seal.

The use of a melt liner bonded to the shrinkable tube which, upon heating of the tube (and thereby causing it to shrink about the article) caused the melt liner to flow in an attempt to fill the voids and seal the article within the shrunken tubing is known. The current hot melt lined shrink tubing, however, has a hot melt liner which is partially cross-linked. This results in a product which, due to the partial cross-linking, does not flow easily upon the shrinking of the tube about an article, causing incomplete filling of the voids and therefore incomplete sealing.

Therefore, what is needed in this art is a heat deformable article having a melt liner which flows easily and uniformly resulting in a more complete sealing of the article in the tube.

DISCLOSURE OF INVENTION

The present invention is a heat deformed tubular article of heat deformable material which, upon exposure to sufficient heat, will return substantially to its original shape. The tubular article having an inner surface and an outer surface and at least one of the surfaces having a melt liner of noncross-linked, cross-linkable thermoplastic material bonded thereto.

Also disclosed is the method of manufacture for such a deformable tubular article of the present invention and a method of encapsulating a substrate using the tubular article of the present invention.

Other features and advantages will be apparent from the specification and claims and from the accompanying drawings which illustrate an embodiment of the invention.

BEST MODE FOR CARRYING OUT THE INVENTION

Figure 1:
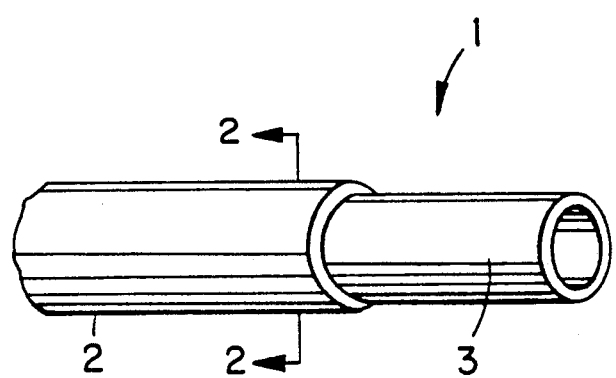
FIG. 1 depicts an exploded view of the present invention.
Figure 2:
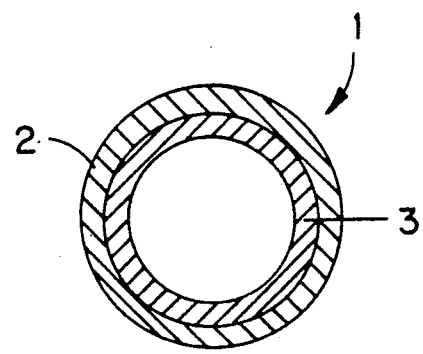
FIG. 2 depicts the present invention having been applied to a substrate.

The heat deformed article may be made from any number of conventional compositions which exhibit the requisite memory such that once they are deformed, they will return to substantially their original, (predeformed shape) upon exposure to sufficient heat. Such articles and the method of forming them are conventional and well known in the art.

Typical compositions are polymeric materials such as ethylene propylene dieneterpolymer, neoprene, polyvinyl chloride, polyolefins, silicone and other materials. These materials should possess sufficient crystallinity at normal ambient temperatures to maintain the deformed shape, while having sufficient elasticity to return to substantially its predeformed shape when the crystalline structure is raised above its melt temperature.

Some of the materials useful for forming these tubes will inherently possess sufficient crystallinity while other materials will require additions of a copolymer with sufficient crystallinity to allow the material to be deformed and respond to heat properly. The particular materials useful in preparing the copolymers are well known to those skilled in the art.

The tubular structure of heat deformable material is prepared using conventional techniques. Typically, this means passing the polymer material (usually in granular or pellet form), into a heated hopper, where the polymer is melted. The melted polymer is then forced through an extruder barrel to form a tubular shape which is then cooled to below the crystalline melt temperature of the material (below about 100° F.). The tubular structure (which is in the form of a continuous tube) may or may not require that the polymer material be cross-linked prior to further processing. If cross-linking is required, it may be performed using conventional techniques such as by chemical means or by irradiation; i.e. electron beam or atomic pile. One method of cross-linking comprises introducing an organic peroxide into the polymer which is then actuated by passing the tubing through steam and pressure thereby causing the polymer to cross-link.

Typically the tubular structure is then heated to above the crystalline melt temperature and applying sufficient stresses on the heated tube to cause the tube to be deformed in the desired shape. The most common stress is in the radial direction to cause the tube to expand radially thereby creating a tube which, when heated again to a sufficient temperature, will shrink radially.

The manner of applying these stresses are conventional and would be known to those skilled in this art. For example, in preparing a radial heat shrinkable tubing, the tube is heated and is forced about a heated mandrel having a larger outside dimension than the internal dimension of the tube. An alternative method would be to apply a high pressure differential between the inside and outside of the tubing while it is being heated causing the tube to expand.

In all of these cases once the tubing has been deformed it is cooled to below its crystalline melt temperature while still in the deformed condition.

Tubing of this type will generally be produced in predeformed internal diameters of about 3/64 inch to about 4 inches and having wall thicknesses of about 10 mils to about 120 mils or thicker in the expanded state.

Once the tubular structures are formed and then deformed to the desired dimensions, a melt liner is applied. The term melt liner, for purposes of this invention, means a distinct layer of polymeric material which has the property of melting and flowing at or below about the same temperature as that which the tubular article will return to its predeformed shape. The purpose of this melt liner is to seal or encapsulate the articles about which the tubular articles have been placed.

These melt liners are formed of any cross-linkable thermoplastic polymer which will melt and flow at the desired temperature and will bond to the surface of the tubular article. The material forming the melt liner is not cross-linked thereby resulting in improved free flowing of the polymer and superior encapsulation. Such materials which are useful as melt liners for this invention are ethylene-vinyl acetate, ethylene vinyl acetate/polyethylene copolymer, other polyolefins, polyurethane elastomers (such as those available from Performance Polymers International of Nashville, Tenn. as C600) and polyamides or acrylics. The preferred material being an ethylene vinyl acetate/polyethylene copolymer having about 5 percent by weight to about 45 percent by weight of ethylene vinyl acetate and most preferably about 20 percent by weight of ethylene vinyl acetate. Typically, these materials will have melt temperatures of about 71.1° C. to about 93.3° C.

The melt liner is formed into a tubular form using any conventional technique. Typically, this will be done in much the same manner as the tubular article disclosed above; wherein the melt liner material is melted in a heated hopper and then extruded in the desired dimension and cooled thereby forming the tube. These tubes should typically have a thickness of from about 6 mils to about 40 mils and when melted will occupy a volume of from two to three times that of the outer jacket.

In forming the tubular article of the present invention, the tubular melt liner is placed in contact with the inner surfaces of the heat deformable article As may be seen in FIG. 1, the heat deformable article 1, has a heat deformable tubing 2 (in the instance it is a radially heat shrinkable tubing) and a melt liner 3 lining the internal surface of the tube. Therefore, in this instance, the melt liner tube will have an external diameter less than that of the deformable tube.

The melt liner in the depicted form is placed inside the deformed tube and both articles are then heated to below the temperature at which the deformed tube returned to its predeformed dimensions yet high enough to cause the melt liner to melt or become tacky. The tacky melt liner and the surface of the deformed tubes are then contacted and cooled causing the melt liner to bond to the deformed tube thereby forming the intended article.

The preferred article is a heat shrinkable tube having a melt liner in the internal diameter of the tube. This may be manufactured by preparing a finite length of heat shrinkable tubing and a similar length of a tubular melt liner. The melt liner is inserted into the heat shrinkable tubing and then one end of the heat shrinkable tube is hermetically sealed and the melt liner is internally pressurized, (through the unsealed end of the deformable tube) using a gas, i.e. air or $N_2$, causing the melt liner to expand and contact the inner surface of the shrink tube. The pressure will vary with the type of materials used, however, low pressure such as about 2 psi to about 20 psi is preferred. The open end of the deformable tube is then sealed so that the melt liner remains pressurized.

The pressurized tube is then exposed to sufficient heat to cause the melt liner to melt sufficiently to bond itself to the inner surface of the tube yet not hot enough to cause the tube to deform.

The tube is then cooled and the pressure relieved.

The improved feature of the present invention is the ability of the noncross-linked melt liner to flow easily and at low temperatures to more completely encapsulate or coat the desired article. This is of particular importance where the article is to be protected from moisture and the presence of air bubbles or voids about the article could cause eventual problems should water migrate through these voids.

While the method herein described constitutes a preferred embodiment of the invention, it is to be understood that the invention is not limited to this precise method and that changes may be made therein without departing from the scope of the invention which is defined in the appended claims.

I claim:

1. A method of manufacturing a unitary heat deformable structure comprising the steps of:
   (a) providing an expanded heat deformable article having an inner surface and being capable of being heated so as to return to its original dimension;
   (b) providing a noncrosslinked thermoplastic article comprising ethylene-vinyl acetate/polyethylene copolymer, having an outer surface, an inner surface and an outside dimension smaller than the inner dimension of the expanded heat deformable article;
   (c) positioning the thermoplastic article inside the expanded heat deformable article such that the resultant composite has a first end and a second end;
   (d) hermetically sealing the first end of the composite formed in step (c);
   (e) pressuring the inner surface of the thermoplastic article so that the thermoplastic article expands into contact with the expanded heat deformable article;
   (f) sealing the second end of the composite formed in step (c);
   (g) heating the thermoplastic article and the expanded heat deformable article to a temperature sufficient to cause the thermoplastic article to flow in contact with the inner surface of the expanded heat deformable article effecting bonding between the thermoplastic article and the expanded heat deformable article, but insufficient to cause the thermoplastic article to fully melt and the heat deformable article to fully recover to its original dimension; and
   (h) cooling the heated composite of step (g) to below a temperature sufficient to solidify the thermoplastic article, thereby bonding the thermoplastic article to the heat deformable article and forming said unitary heat deformable structure.

2. The method of claim 1 wherein step (a) is performed after step (b).

3. The method of claim 1 wherein the thermoplastic article is pressurized from about 2 to about 20 psi.

4. The method of claim 1 wherein both the expanded heat deformable article and the thermoplastic article are tubular.

* * * * *